US 11,155,178 B2

(12) United States Patent
Ohtomo (10) Patent No.: US 11,155,178 B2
(45) Date of Patent: Oct. 26, 2021

(54) POWER-FEED CONNECTOR DISCONNECTION DEVICE AND CHARGING DEVICE

(71) Applicant: SUBARU CORPORATION, Tokyo (JP)

(72) Inventor: Yosuke Ohtomo, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 204 days.

(21) Appl. No.: 16/424,107

(22) Filed: May 28, 2019

(65) Prior Publication Data

US 2020/0094702 A1 Mar. 26, 2020

(30) Foreign Application Priority Data

Sep. 20, 2018 (JP) .............................. JP2018-175715

(51) Int. Cl.
*B60L 53/62* (2019.01)
*H01R 13/639* (2006.01)
(Continued)

(52) U.S. Cl.
CPC ............... *B60L 53/62* (2019.02); *B60L 53/16* (2019.02); *H01R 13/639* (2013.01);
(Continued)

(58) Field of Classification Search
CPC ....... B60L 53/62; B60L 53/16; H01R 13/639; H01R 13/6675; H01R 13/6691; H01R 2201/26; H02J 7/0045
(Continued)

(56) References Cited

U.S. PATENT DOCUMENTS 9,895,987 B2 * 2/2018 Uchiyama ............ H01R 13/639
10,118,575 B2 * 11/2018 Tanigawa .............. B60R 16/033
(Continued)

FOREIGN PATENT DOCUMENTS

JP 2009-065728 A 3/2009
JP 2016-048983 A 4/2016

OTHER PUBLICATIONS

Japanese Office Action, dated May 19, 2020, in Japanese Application No. 2018-175715 and English Translation thereof.

*Primary Examiner* — Suresh Memula
(74) *Attorney, Agent, or Firm* — McGinn I.P. Law Group, PLLC.

(57) ABSTRACT

A power-feed connector disconnection device includes an index value detector, a starting intention determiner, and a lock-releasing unit. The index value detector detects an index value that correlates with a starting intention of a driver to start a vehicle when a power-feed connector is coupled to a power-receiving connector of the vehicle. The starting intention determiner determines a presence or absence of the starting intention of the driver based on the index value detected by the index value detector when the power-feed connector is coupled to the power-receiving connector of the vehicle. The lock-releasing unit is provided in the power-receiving connector and releases a lock between the power-receiving connector and the power-feed connector when the starting intention determiner determines that the driver has the starting intention.

18 Claims, 7 Drawing Sheets

(51) Int. Cl.
*H01R 13/66* (2006.01)
*H02J 7/00* (2006.01)
*B60L 53/16* (2019.01)

(52) U.S. Cl.
CPC ..... *H01R 13/6675* (2013.01); *H01R 13/6691* (2013.01); *H02J 7/0045* (2013.01); *H01R 2201/26* (2013.01)

(58) Field of Classification Search
USPC .......................................................... 320/109
See application file for complete search history.

(56) References Cited

U.S. PATENT DOCUMENTS

| | | | | |
|---|---|---|---|---|
| 10,144,303 | B2* | 12/2018 | Schulte-Coerne | B60R 25/10 |
| 10,183,585 | B2* | 1/2019 | Furuhashi | B60L 3/04 |
| 10,479,200 | B2* | 11/2019 | Morisset | B60W 30/146 |
| 10,655,590 | B2* | 5/2020 | Yagura | H02P 6/28 |
| 10,859,027 | B2* | 12/2020 | Blake | F02D 41/062 |
| 2004/0002808 | A1* | 1/2004 | Hashimoto | F02D 11/107 |
| | | | | 701/107 |
| 2009/0057041 | A1* | 3/2009 | Kamaga | B60L 3/00 |
| | | | | 180/65.245 |
| 2010/0120581 | A1* | 5/2010 | Mitsutani | B60L 53/14 |
| | | | | 477/7 |

* cited by examiner

POWER-FEED CONNECTOR DISCONNECTION DEVICE AND CHARGING DEVICE

CROSS-REFERENCE TO RELATED APPLICATIONS

The present application claims priority from Japanese Patent Application No. 2018-175715 filed on Sep. 20, 2018, the entire contents of which are hereby incorporated by reference.

BACKGROUND

The disclosure relates to a power-feed connector disconnection device and a charging device, in particular to a power-feed connector disconnection device that disconnects a power-feed connector coupled to a power-receiving connector of a vehicle such as an electric automobile or a plug-in hybrid vehicle and to a charging device including a power-feed connector that can be coupled to a power-receiving connector to which the power-feed connector disconnection device is applied.

In recent years, plug-in hybrid vehicles (PHV) that can efficiently improve the fuel consumption rate (fuel efficiency) of a vehicle by using an engine and an electric motor together and electric vehicles (EV) that use only an electric motor as a driving source and do not discharge exhaust gas have been widely put into practical use. In such plug-in hybrid vehicles and electric vehicles, for example, a battery module (high-voltage battery), in which a plurality of secondary batteries (battery cells) such as lithium-ion batteries are connected in series, is mounted.

With the prevalence of plug-in hybrid vehicles and electric vehicles, the introduction of vehicle charging devices (battery chargers) to, for example, parking lots of commercial facilities and public facilities has been promoted. Normally, a vehicle is charged by coupling a power-feed connector (charging gun) coupled to a charging device (battery charger) via a charging cable to a power-receiving connector of the vehicle.

Japanese Unexamined Patent Application Publication No. 2009-065728 discloses an electric motor vehicle that performs control to cause the vehicle to be in a traveling-impossible state (READY OFF state) when the charging cable is coupled to the vehicle, that is, when the power-feed connector (charging gun) is coupled to the power-receiving connector, to prevent the vehicle from driving while the charging cable is still coupled to the vehicle.

SUMMARY

An aspect of the disclosure provides a power-feed connector disconnection device including an index value detector configured to detect an index value that correlates with a starting intention of a driver to start a vehicle when a power-feed connector is coupled to a power-receiving connector of the vehicle, a starting intention determiner configured to determine a presence or absence of the starting intention of the driver on a basis of the index value detected by the index value detector when the power-feed connector is coupled to the power-receiving connector of the vehicle, and a lock-releasing unit that is provided in the power-receiving connector and configured to release a lock between the power-receiving connector and the power-feed connector when the starting intention determiner determines that the driver has the starting intention.

An aspect of the disclosure provides a power-feed connector disconnection device including an index value and circuitry. The index value detector is configured to detect an index value that correlates with a starting intention of a driver to start a vehicle when a power-feed connector is coupled to a power-receiving connector of the vehicle. The circuitry is configured to determine a presence or absence of the starting intention of the driver on a basis of the index value detected by the index value detector when the power-feed connector is coupled to the power-receiving connector of the vehicle. The circuitry is configured to release a lock between the power-receiving connector and the power-feed connector when the starting intention determiner determines that the driver has the starting intention.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

FIG. 2A and FIG. 2B are schematic diagrams illustrating an example of a lock/unlock mechanism included in the power-feed connector disconnection device according to the embodiment, FIG. 2A is a plan view and a side view during the locked state, and FIG. 2B is a side view during the unlocked state;

FIG. 3A and FIG. 3B are schematic diagrams illustrating an example of a power-feed connector disconnection mechanism included in the power-feed connector disconnection device according to the embodiment, FIG. 3A illustrates a state during normal operation, and FIG. 3B illustrates a state during a power-feed connector disconnection operation;

FIG. 4A and FIG. 4B are schematic diagrams illustrating another example of a power-feed connector disconnection mechanism included in the power-feed connector disconnection device according to the embodiment, FIG. 4A illustrates a state during normal operation, and FIG. 4B illustrates a state during a power-feed connector disconnection operation;

DETAILED DESCRIPTION

In the following, a preferred but non-limiting embodiment of the disclosure is described in detail with reference to the accompanying drawings. Note that sizes, materials, specific values, and any other factors illustrated in the embodiment are illustrative for easier understanding of the disclosure, and are not intended to limit the scope of the disclosure unless otherwise specifically stated. Further, elements in the following example embodiment which are not recited in a most-generic independent claim of the disclosure are optional and may be provided on an as-needed basis. Throughout the present specification and the drawings, elements having substantially the same function and configuration are denoted with the same reference numerals to avoid any redundant description. Further, elements that are not directly related to the disclosure are unillustrated in the drawings. The drawings are schematic and are not intended to be drawn to scale. In the present disclosure, the term "power-feed connector" includes devices similar to the power-feed connector.

Typically, to charge a high-voltage battery mounted in a plug-in hybrid vehicle (PHV) or an electric vehicle (EV), it takes several tens of minutes to several hours. Therefore, for example, a vehicle may be charged while the driver remains in the vehicle in the middle of the night in a public parking lot or the like. Here, regarding the electric motor vehicle described above, when the power-feed connector (charging gun) is coupled to the power-receiving connector, the vehicle is in a traveling-impossible state (READY OFF state). Therefore, when the vehicle is being charged while a driver remains in the vehicle, if a hazardous condition occurs, for example, if a suspicious person approaches the vehicle, even if the driver tries to start the vehicle, the driver is prevented from starting the vehicle without first exiting the vehicle and disconnecting the power-feed connector (charging gun).

Further, for example, when a vehicle stops and waits for a signal change, if a malicious person couples a device similar to the power-feed connector (charging gun) to the power-receiving connector of the vehicle, the vehicle enters a READY OFF state and is unable to start. Therefore, there is a request to make it possible for a driver to forcibly disconnect the power-feed connector (charging gun) from the power-receiving connector from inside the vehicle (without the driver having to exit the vehicle) when an emergency occurs while the power-feed connector is coupled to the power-receiving connector.

It is desirable to provide a power-feed connector disconnection device that can forcibly disconnect a power-feed connector (charging gun) coupled to a power-receiving connector of a vehicle from inside the vehicle during, for example, an emergency, and a charging device including a power-feed connector that can be coupled to a power-receiving connector to which the power-feed connector disconnection device is applied.

Figure 1:
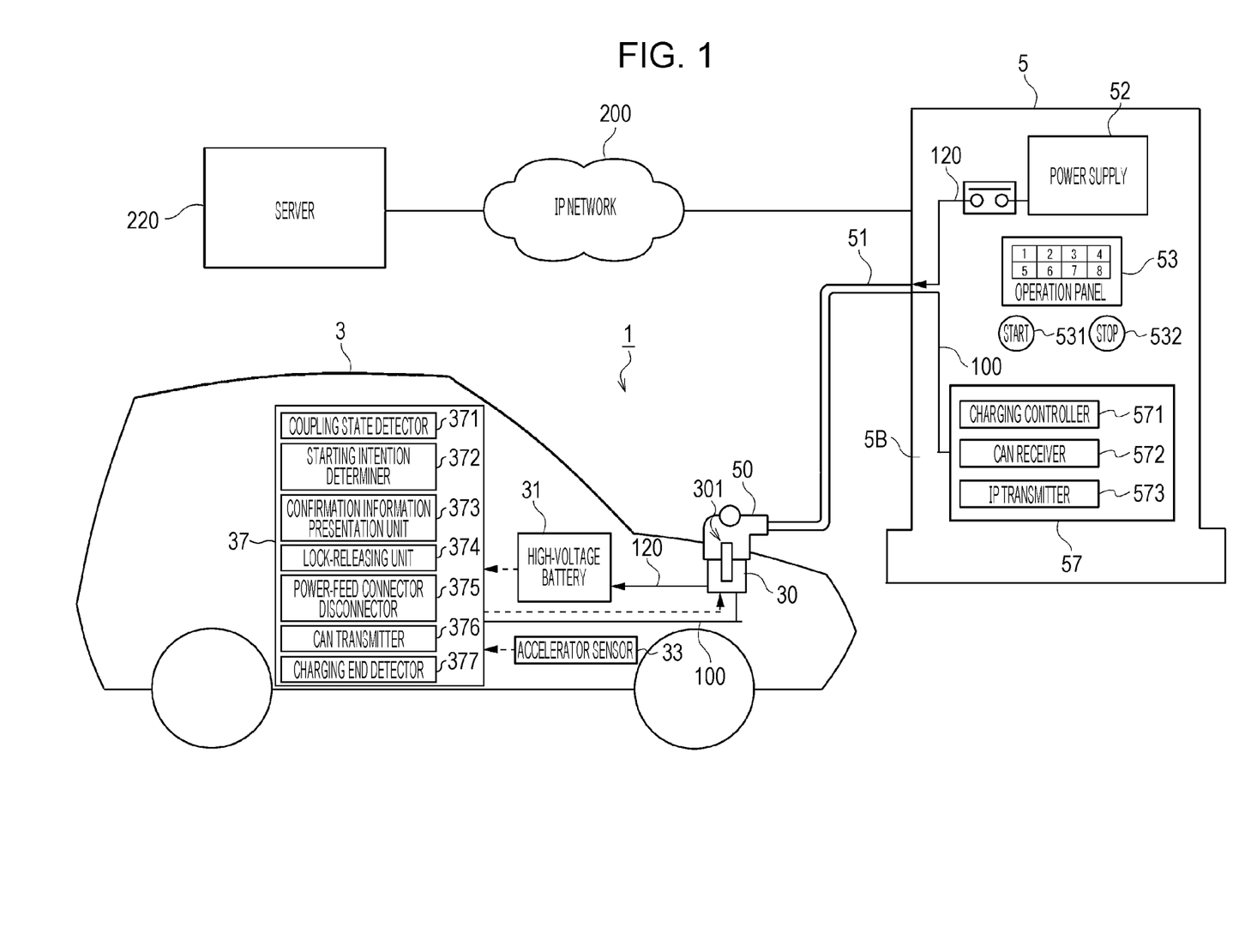
FIG. 1 is a block diagram illustrating a configuration of a power-feed connector disconnection device according to an embodiment, a vehicle including a power-receiving connector to which the power-feed connector disconnection device is applied, and a charging device including a power-feed connector that can be coupled to the power-receiving connector.
Figure 2A:
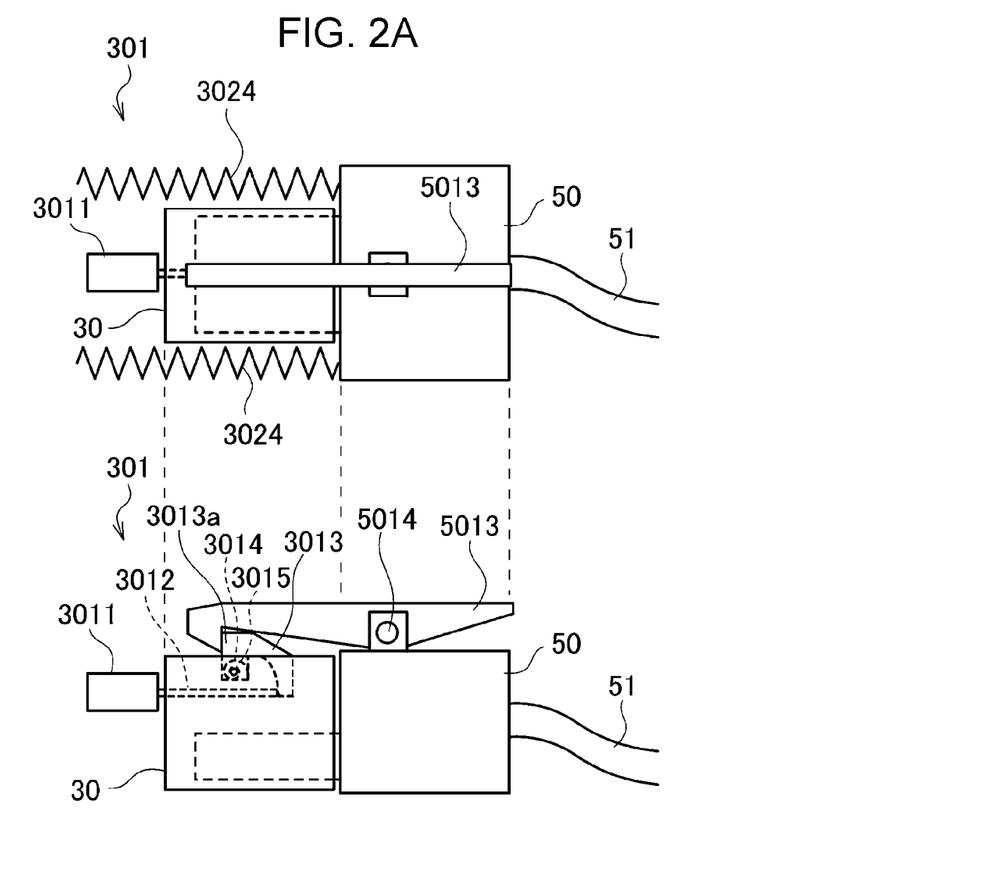
Figure 2B:
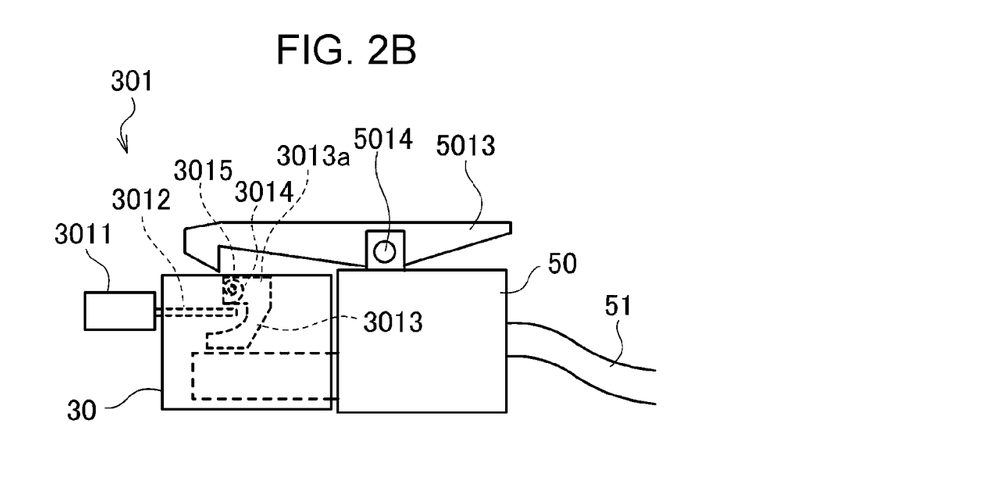
Figure 3A:
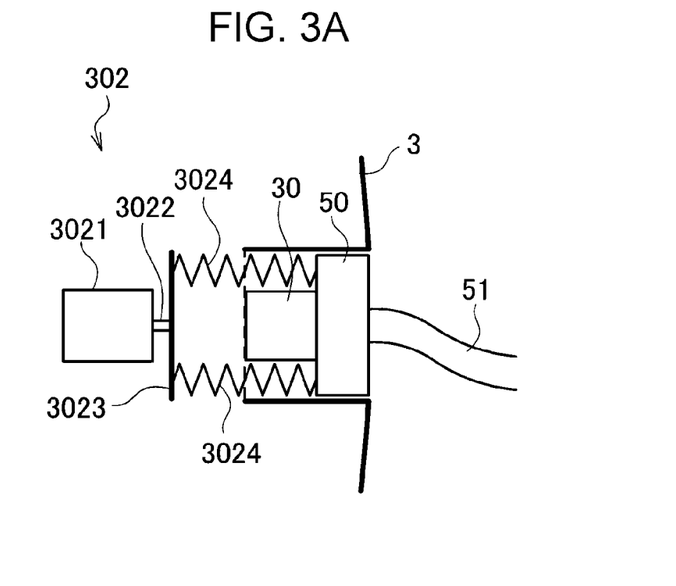
Figure 3B:
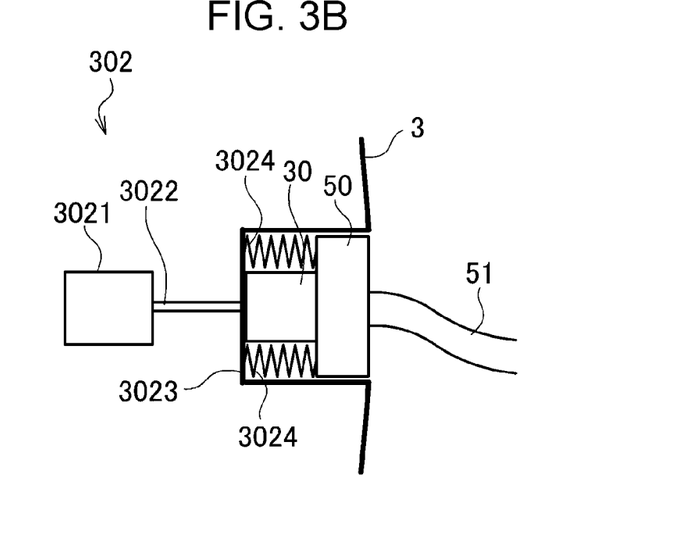
Figure 4A:
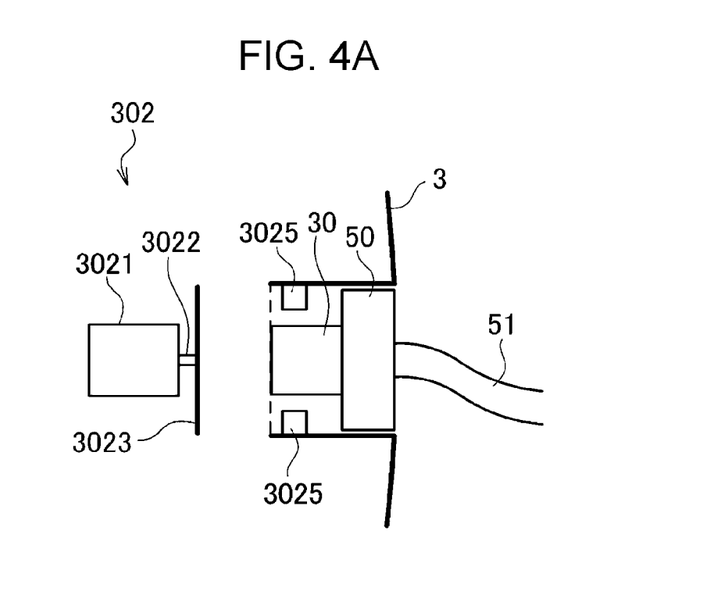
Figure 4B:
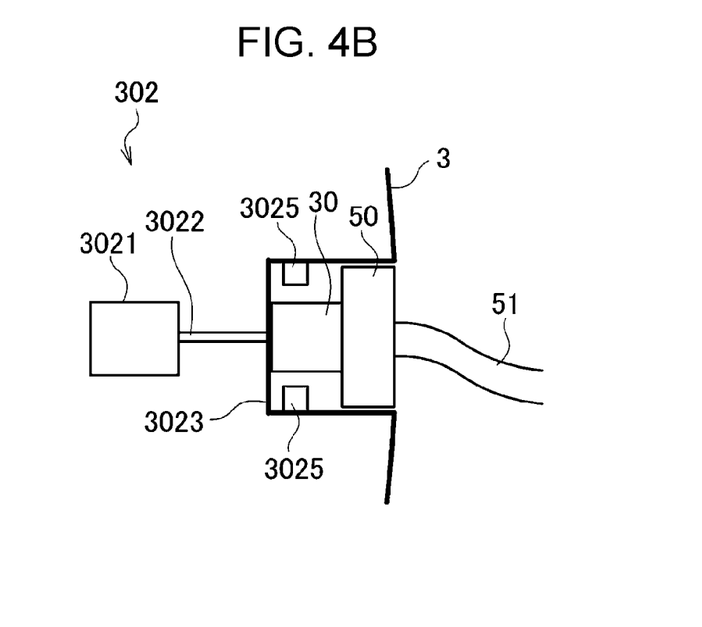

First, with reference to FIGS. 1 to 4, a configuration of a power-feed connector disconnection device 1 according to the embodiment, a vehicle 3 including a power-receiving connector 30 to which the power-feed connector disconnection device 1 is applied, and a charging device 5 including a power-feed connector 50 that can be coupled to the power-receiving connector 30 will be described. FIG. 1 is a block diagram illustrating the configuration of the power-feed connector disconnection device 1, a vehicle 3 including the power-receiving connector 30 to which the power-feed connector disconnection device 1 is applied, and the charging device 5 including the power-feed connector 50 that can be coupled to the power-receiving connector 30. FIG. 2A and FIG. 2B are schematic diagrams illustrating an example of a lock/unlock mechanism 301 included in the power-feed connector disconnection device 1. FIG. 2A is a plan view and a side view during a locked state, and FIG. 2B is a side view during an unlocked state. FIG. 3A and FIG. 3B are schematic diagrams illustrating an example of a power-feed connector disconnection mechanism 302 included in the power-feed connector disconnection device 1. FIG. 3A illustrates a state during normal operation, and FIG. 3B illustrates a state during a power-feed connector disconnection operation. FIG. 4A and FIG. 4B are schematic diagrams illustrating another example of the power-feed connector disconnection mechanism 302 included in the power-feed connector disconnection device 1. FIG. 4A illustrates a state during normal operation, and FIG. 4B illustrates a state during a power-feed connector disconnection operation. FIG. 1 illustrates only a configuration related to charging of a high-voltage battery 31 in a configuration of the vehicle 3 and omits other configurations, for example, a configuration of a driving mechanism and the like.

The vehicle 3 is a so-called plug-in vehicle such as a plug-in hybrid vehicle (PHV) or an electric vehicle (EV), which include a motor generator as a driving power source and the high-voltage battery 31 that supplies power to the motor generator and which is configured to be able to charge the high-voltage battery 31 from the charging device 5 outside the vehicle. The high-voltage battery 31 is configured by connecting, for example, several tens to one hundred and several tens of battery cells in series (that is, configured as a high-voltage battery of several tens to several hundreds of volts). As the battery cell, for example, a lithium-ion battery is suitably used. However, a rechargeable/dischargeable secondary battery such as a nickel-cadmium battery can also be used instead of the lithium-ion battery. In the vehicle 3, the high-voltage battery 31 is charged by using power supplied from the charging device 5.

The vehicle 3 is provided with an openable and closable charging lid, and the power-receiving connector 30 that can be coupled to (fitted to) the power-feed connector 50 of the charging device 5 is disposed inside the charging lid. The power-receiving connector 30 has, for example, a pair of power-receiving terminals (+, −) coupled to a power line 120, a pair of communication terminals coupled to a communication line (CAN 100), a wakeup signal terminal coupled to a wakeup signal line (not illustrated in the drawings), and the like. When the power-receiving connector 30 and the power-feed connector 50 are coupled to each other, the power lines 120, the communication lines (CANs 100), and the wakeup signal lines on the vehicle 3 side and the charging device 5 side are coupled via the power-receiving connector 30 and the power-feed connector 50 so that supply of power, communication of various information, and supply of the wakeup signal can be performed.

The power-receiving connector 30 is provided with the lock/unlock mechanism 301 that locks (locks up) or unlocks (releases) the connection with the power-feed connector 50 of the charging device 5, and the power-feed connector disconnection mechanism 302 that disconnects the power-feed connector 50 from the power-receiving connector 30.

As illustrated in FIG. 2A and FIG. 2B, the lock/unlock mechanism 301 is configured to mainly have an actuator 3011, a shaft 3012, and a rotating member 3013. As the actuator 3011, for example, a linear solenoid is suitably used. The actuator 3011 has a shaft 3012 and advances/retreats the shaft 3012 in the shaft direction. As a configuration that advances/retreats the shaft 3012 in the shaft direction, for example, a method that causes a motor to rotate a ball screw and converts a rotational motion to a linear motion can be employed.

The rotating member 3013 is attached rotatably with a rotating shaft 3015 as an axis. A torsion spring 3014 (or a spiral spring) is disposed (coaxially) around the rotating shaft 3015. When the shaft 3012 advances, the rotating member 3013 is pushed by the shaft 3012 and rotated counterclockwise (in FIG. 2A and FIG. 2B). At this time, the torsion spring 3014 is wound to generate a clockwise energizing force. On the other hand, when the shaft 3012 retreats, the torsion spring 3014 is released and the rotating member 3013 is rotated clockwise (in FIG. 2A and FIG. 2B) by the energizing force of the torsion spring 3014.

On the other hand, a locking member 5013 is swingably attached to the power-feed connector 50 of the charging device 5 with a swinging shaft 5014 as an axis. A claw is formed at a tip (one end) of the locking member 5013. When the shaft 3012 of the lock/unlock mechanism 301 advances and the rotating member 3013 is rotated counterclockwise, the claw of the locking member 5013 and a protruding member (receiving member) 3013a of the rotating member 3013 are engaged (locked) with each other. On the other hand, when the shaft 3012 retreats and the rotating member 3013 is rotated clockwise, the engagement of the claw of the locking member 5013 and the protruding member (receiving member) 3013a of the rotating member 3013 is released (unlocked).

Specifically, during locking (locking up), as illustrated in FIG. 2A, when the actuator 3011 is driven and the shaft 3012 advances, the rotating member 3013 is (pushed and) rotated counterclockwise (with respect to the drawing) with the rotating shaft 3015 as an axis along with the advance of the shaft 3012, and the protruding member (receiving member) 3013a of the rotating member 3013 and the claw of the locking member 5013 are engaged (locked). On the other hand, during unlocking (releasing), as illustrated in FIG. 2B, when the driving of the actuator 3011 is stopped and the shaft 3012 retreats, the rotating member 3013 is rotated clockwise with the rotating shaft 3015 as an axis by the energizing force of the torsion spring 3014, and the engagement of the protruding member (receiving member) 3013a of the rotating member 3013 and the claw of the locking member 5013 is released (unlocked).

The locking (locking up) or unlocking (releasing) of the lock/unlock mechanism 301, that is, the driving of the actuator 3011 is controlled by a control unit (CU) 37 (lock-releasing unit 374).

As illustrated in FIG. 3A and FIG. 3B, the power-feed connector disconnection mechanism 302 is configured to mainly have an actuator 3021, a shaft 3022, a sealing plate 3023, and a compression coil spring 3024. As the actuator 3021, for example, a linear solenoid is suitably used. The actuator 3021 has the shaft 3022 and advances/retreats the shaft 3022 in the shaft direction. As a configuration that advances/retreats the shaft 3022 in the shaft direction, for example, a method that causes a motor to rotate a ball screw and converts a rotational motion to a linear motion can be employed.

A flat plate-like sealing plate 3023 is attached to a tip of the shaft 3022 (outer plate side of the vehicle 3) so as to be orthogonal to the shaft 3022. A plurality of compression coil springs 3024 are attached perpendicularly to the sealing plate 3023 (surface on the outer plate side of the vehicle 3). When the power-feed connector 50 is coupled to the power-receiving connector 30, tips of the plurality of compression coil springs 3024 come into contact with the power-feed connector 50.

Therefore, during normal operation, as illustrated in FIG. 3A, the shaft 3022 is retreated and the sealing plate 3023 is moved (retreated) to the inside of the vehicle 3, and therefore the power-feed connector 50 can be easily coupled to the power-receiving connector 30. On the other hand, while disconnecting the power-feed connector 50, as illustrated in FIG. 3B, when the actuator 3021 is driven and the shaft 3022 advances, the sealing plate 3023 moves (advances) to the outer plate side of the vehicle 3, the plurality of compression coil springs 3024 are compressed, and an energizing force is applied in a direction in which the power-feed connector 50 is disconnected from the power-receiving connector 30. Therefore, when the lock is released, the power-feed connector 50 is disconnected from the power-receiving connector 30 by the energizing force of the compression coil springs 3024. A reaction force (counteraction) of the compression coil springs 3024 in this case is received by the sealing plate 3023.

The disconnection between the power-receiving connector 30 and the power-feed connector 50, performed by the power-feed connector disconnection mechanism 302, that is, the driving of the actuator 3021, is controlled by the control unit (CU) 37 (power-feed connector disconnector 375).

As illustrated in FIG. 4A and FIG. 4B, it is also possible to employ a configuration in which inflators 3025 that generate (blow out) a gas are used instead of the compression coil springs 3024, and the power-feed connector 50 is disconnected from the power-receiving connector 30 by pressure of the gas blown out from the inflators 3025.

The control unit (CU) 37 is coupled with an accelerator sensor 33 that detects a depression amount of an accelerator pedal (accelerator opening degree). In one embodiment, the accelerator sensor 33 may serve as an "index value detector". The control unit (CU) 37 repeatedly reads a value detected by the accelerator sensor 33 (a voltage value according to the depression amount of the accelerator pedal (the accelerator opening degree)) at predetermined timings. In particular, the control unit (CU) 37 reads the value detected by the accelerator sensor 33 (the depression amount of the accelerator pedal) as an index value that correlates with a starting intention of a driver when the power-feed connector 50 is coupled to the power-receiving connector 30 of the vehicle 3 (that is, when the vehicle 3 is in the READY OFF state).

The control unit (CU) 37 controls the charging of the high-voltage battery 31. The control unit (CU) 37 has a function to forcibly disconnect the power-feed connector (charging gun) 50 coupled to the power-receiving connector 30 of the vehicle 3 in an emergency, for example, from inside the vehicle. Therefore, the control unit 37 functionally includes a coupling state detector 371, a starting intention determiner 372, a confirmation information presentation unit 373, a lock-releasing unit 374, a power-feed connector disconnector 375, a CAN transmitter (CAN communication unit) 376, and a charging end detector 377.

The control unit 37 includes, for example, a CPU that performs calculation, a non-volatile memory such as an EEPROM that stores a program and data for causing the CPU to execute processing, a RAM that temporarily stores various data such as calculation results, and an I/O interface including a driving circuit (driver circuit) that drives the actuator 3011, the actuator 3021, and the like. In the control unit 37, when a program stored in the EEPROM or the like is executed by the CPU, each function of the coupling state detector 371, the starting intention determiner 372, the confirmation information presentation unit 373, the lock-releasing unit 374, the power-feed connector disconnector 375, the CAN transmitter (CAN communication unit) 376, and the charging end detector 377 is realized.

The coupling state detector 371 detects whether the power-receiving connector 30 and the power-feed connector 50 are coupled (fitted) to each other. Whether both connectors are coupled to each other is detected based on, for example, a value detected by a sensor provided at a tip (fitting member) of the power-receiving connector 30 and/or a communication state of the CAN 100 (whether the communication can be performed). A detection result (whether the power-receiving connector 30 and the power-feed connector 50 are coupled to each other) detected by the coupling state detector 371 is output to the starting intention determiner 372 and the like.

The starting intention determiner 372 determines the presence or absence of a starting intention (traveling intention) of the driver based on the accelerator opening degree detected by the accelerator sensor 33 when the power-receiving connector 30 and the power-feed connector 50 are coupled (that is, when the vehicle 3 is in the READY OFF state). In one embodiment, the starting intention determiner 372 may serve as a "starting intention determiner". More specifically, first, the starting intention determiner 372 determines that the driver has a starting intention when, for example, the depression amount of the accelerator pedal (the accelerator opening degree) detected by the accelerator sensor 33 is a first predetermined value or more (for example, 90% or more) (first starting intention determination). Here, for example, the presence or absence of a starting intention of the driver may be determined in accordance with, for example, whether a startup switch (start switch) is pressed a plurality of times within a predetermined period of time instead of or in addition to the depression amount of the accelerator pedal.

In particular, in some embodiments, the starting intention determiner 372 determines the presence or absence of a starting intention of the driver again (second starting intention determination) after disconnection confirmation information (details will be described later) is presented by the confirmation information presentation unit 373 after the first starting intention determination. More specifically, when determining the presence or absence of a starting intention of the driver again after the disconnection confirmation information is presented, the starting intention determiner 372 determines (confirms) that the driver has a starting intention when a state in which the depression amount of the accelerator pedal (the accelerator opening degree) is a second predetermined value (for example, 30%) or more continues for a predetermined period of time (for example, three seconds) or longer. A determination result (the presence or absence of a starting intention of the driver) determined by the starting intention determiner 372 is output to the confirmation information presentation unit 373, the lock-releasing unit 374, the power-feed connector disconnector 375, and the like.

When the starting intention determiner 372 determines that the driver has a starting intention (the first starting intention determination), the confirmation information presentation unit 373 presents disconnection confirmation information confirming that the power-feed connector 50 will be forcibly disconnected (for example, a guidance notification such as "The charging gun is coupled—vehicle prevented from traveling. To forcibly release the charging gun, depress the accelerator pedal for three seconds") to the driver by, for example, driving an LCD display, a speaker, and the like. In one embodiment, the confirmation information presentation unit 373 may serve as a "confirmation information presentation unit".

When the power-feed connector 50 is forcibly disconnected, the confirmation information presentation unit 373 makes an announcement such as "To enable the vehicle to travel, press the start button while depressing the brake pedal" by using a screen display, voice output, or the like. Further, when the vehicle 3 enters a traveling-possible state, the confirmation information presentation unit 373 makes an announcement such as "The vehicle can now travel" by using a screen display, voice output, or the like. In some embodiments, even if a user performs a system startup operation such as pressing the start button, when a system startup condition is not established (for example, when the brake is not depressed or a gear shift lever position is not in the P/N position), the user is notified accordingly.

On the other hand, in some embodiments, when the vehicle 3 is in the traveling-possible state (READY ON and a gear shift lever position other than in the P/N range) and the power-feed connector 50 is coupled, the confirmation information presentation unit 373 makes an announcement such as "A charging device is coupled" by using a screen display, voice output, or the like. Further, in some embodiments, when the user performs a charging start operation of the charging device 5 (such as pressing a charging start switch 531), the confirmation information presentation unit 373 makes an announcement such as "Warning: Forcibly disconnecting the charging gun may result in damage leading to costly repairs" by using a screen display, voice output, or the like.

When it is determined that the driver has a starting intention, the lock-releasing unit 374 releases a lock between the power-receiving connector 30 and the power-feed connector 50 by driving the lock/unlock mechanism 301 (the actuator 3011). In one embodiment, the lock-releasing unit 374 and the lock/unlock mechanism 301 may serve as a "lock-releasing unit". The lock/unlock mechanism 301 is as described above, and, therefore, detailed description is omitted here. In particular, in some embodiments, the lock-releasing unit 374 may release the lock between the power-receiving connector 30 and the power-feed connector 50 by driving the lock/unlock mechanism 301 (the actuator 3011) when it is determined (confirmed) again that the driver has a starting intention after the disconnection confirmation information is presented by the confirmation information presentation unit 373.

When it is determined that the driver has a starting intention, the power-feed connector disconnector 375 disconnects the power-feed connector 50 from the power-receiving connector 30 by driving the power-feed connector disconnection mechanism 302 (the actuator 3021). In one embodiment, the power-feed connector disconnector 375 and the power-feed connector disconnection mechanism 302 may serve as a "power-feed connector disconnection unit". The power-feed connector disconnection mechanism 302 is as described above, and, therefore, detailed description is omitted here.

In particular, it is preferable that the power-feed connector disconnector 375 disconnect the power-feed connector 50 from the power-receiving connector 30 by driving the power-feed connector disconnection mechanism 302 (the actuator 3021) when it is determined (confirmed) again that the driver has a starting intention after the disconnection confirmation information is presented by the confirmation information presentation unit 373.

When the lock between the power-receiving connector 30 and the power-feed connector 50 is released and the power-receiving connector 30 and the power-feed connector 50 are disconnected, the CAN transmitter (CAN communication unit) 376 transmits charging stop request information for requesting charging to be stopped (or power reduction request information for requesting reduction of charging power) to the charging device 5 coupled with the power-feed connector 50 via the CAN 100 in advance. In one embodiment, the CAN transmitter 376 may serve as a "transmitter". Further, when the lock between the power-receiving connector 30 and the power-feed connector 50 is released and the connection between the power-receiving connector 30 and the power-feed connector 50 is disconnected, the CAN transmitter 376 transmits vehicle identification information that can identify the vehicle 3 and power-feed connector disconnection information indicating that the power-feed connector 50 will be forcibly disconnected from the vehicle 3 side (for example, additional information such as a flag indicating a forcible disconnection in an emergency) to the charging device 5 coupled with the power-feed connector 50 via the CAN 100 in advance.

The charging end detector 377 detects end of charging (normal ending or forcible ending). More specifically, the charging end detector 377 detects that the charging has ended (ends normally), for example, when an amount of charge (SOC: State Of Charge) of the high-voltage battery 31 reaches a predetermined value (for example, 80%) or a voltage value of the high-voltage battery 31 reaches a predetermined voltage (for example, 400 V). Information indicating that the end of charging is detected is transmitted to the charging device 5 via the CAN 100 that is coupled to the charging device 5 via the power-receiving connector 30 and the power-feed connector 50. The end of charging may be determined on the charging device 5 side.

The charging device (charger) 5 charges the high-voltage battery 31 mounted in the vehicle 3. The charging device 5 may be a high-speed charger or a normal charger. The charging standard (for example, CHAdeMO (registered trademark), CCS, or the like) is irrelevant.

The charging device (charger) 5 includes mainly a main body 5B, a charging cable 51, and the power-feed connector 50. The main body 5B includes mainly a power supply 52, an operation panel 53, a charging start switch 531, a charging stop switch 532, and a control unit (CU) 57. Further, the control unit (CU) 57 functionally includes a charging controller 571, a CAN receiver (CAN communication unit) 572, and an IP transmitter (IP communication unit) 573.

The main body 5B (the power supply 52) of the charging device 5 is coupled with the charging cable 51. A tip of the charging cable 51 is coupled with the power-feed connector 50 that can be coupled to the power-receiving connector 30 of the vehicle 3 (that is, the power-receiving connector 30 to which the power-feed connector disconnection device 1 described above is applied). As described above, the power-feed connector 50 has the locking member 5013 and is configured to be able to be locked with the power-receiving connector 30.

In the same manner as the power-receiving connector 30, the power-feed connector 50 has, for example, a pair of power-receiving terminals (+, −) coupled to the power line 120, a pair of communication terminals coupled to the communication line (CAN 100), a wakeup signal terminal coupled to the wakeup signal line, and the like. When the power-feed connector 50 and the power-receiving connector 30 are coupled, the power lines 120, the communication lines (CANs 100), and the wakeup signal lines on the charging device 5 side and the vehicle 3 side are coupled via the power-feed connector 50 and the power-receiving connector 30 so that supply of power, communication of various information, and supply of the wakeup signal can be performed.

The power supply 52 includes, for example, a transformer, a rectifier circuit, and a regulator circuit (DC-DC converter) and generates a desired DC power (charging power) from external AC power. Then, the power supply 52 outputs the generated power to the charging cable 51 and the power-feed connector 50 coupled to the power supply 52.

The operation panel 53 is composed of, for example, a touch panel or the like and displays a charging setting, a charging condition, an operation screen, and the like. The operation panel 53 is coupled to the control unit 57 and outputs received operation information and the like to the control unit 57.

The charging start switch 531 is composed of, for example, a push button switch or the like and receives an operation to start charging. The charging start switch 531 is coupled to the control unit 57 and outputs received charging start operation information to the control unit 57.

The charging stop switch 532 is composed of, for example, a push button switch or the like and receives an operation to stop charging. The charging stop switch 532 is coupled to the control unit 57 and outputs received charging stop operation information to the control unit 57.

The control unit (CU) 57 comprehensively controls the charging device 5 based on user operation information read from the operation panel 53, the charging start switch 531, and the charging stop switch 532 described above, and various information such as charging parameters, charging end information, charging stop request information, vehicle identification information, and power-feed connector disconnection information, which are received from the control unit 37 of the vehicle 3 via the CAN 100. The control unit 57 functionally includes mainly the charging controller 571, the CAN receiver (CAN communication unit) 572, and the IP transmitter (IP communication unit) 573.

The control unit 57 includes, for example, a CPU that performs calculation, a non-volatile memory such as an EEPROM that stores a program and data for causing the CPU to execute processing, a RAM that temporarily stores various data such as calculation results, and an I/O interface. In the control unit 57, when a program stored in the EEPROM or the like is executed by the CPU, functions of each component described above are realized.

The charging controller 571 controls driving of the power supply 52. More specifically, in normal operation, the charging controller 571 controls the power supply 52 so that the charging power is supplied to the vehicle 3 (the high-voltage battery 31) until information indicating that the end of charging is detected is received from the control unit (CU) 37 (the charging end detector 377) on the vehicle 3 side or until a predetermined period of time (for example, two hours) elapses from when the charging is started. Whether the charging has ended may be detected on the charging device 5 side. However, when the charging stop request information for requesting charging to be stopped (that is, the power reduction request information for requesting reduction of charging power) is received from the vehicle 3 (in an emergency), the charging controller 571 reduces the charging power to zero and ends the charging.

The CAN receiver (CAN communication unit) 572 receives the vehicle identification information that is used to identify the vehicle 3, the power-feed connector disconnection information indicating that the power-feed connector 50 will be forcibly disconnected from the vehicle 3 side, the charging parameters, the charging end information, the charging stop request information, and the like via the CAN 100. In one embodiment, the CAN receiver (CAN communication unit) 572 may serve as a "receiver".

The IP transmitter (IP communication unit) 573 transmits (provides notification of) the vehicle identification information and the power-feed connector disconnection information received by the CAN receiver (CAN communication unit) 572 to an external server 220 or the like via an IP network (the Internet) 200. In one embodiment, the external server 220 may serve as an "external apparatus". In one embodiment, the IP transmitter (IP communication unit) 573 may serve as a "transmitter".

When the charging device 5 (the control unit 57) receives forcible disconnection information of the power-feed connector 50, the charging device 5 (the control unit 57) may perform operations (1) to (3) as described below. (1) Charge a predetermined fee to a credit card read at a charging start time. (2) When it is detected that the same vehicle 3 is coupled to a network of a person in the same business next time, charge a repair cost/predetermined fee to a read credit card this time. (3) Send an invoice to a customer's home by collating a recognition number specific to a vehicle with customer information.

Further, when the charging device 5 (the control unit 57) receives forcible disconnection information of the power-feed connector 50, the charging device 5 (the control unit 57) may automatically transmit (provide notification of) to the server 220 (an investigative authority or the like) information such as the date and time of occurrence of forcible disconnection, position of the charging device, and a recognition number specific to a vehicle, and information such as the SOC of the vehicle 3 at a time point of forcible disconnection and electric power consumption at a time point of previous travelling. Further, when it is detected that the vehicle 3 for which emergency disconnection is performed is coupled to a network of a person in the same business next time, the charging device 5 (the control unit 57) may automatically transmit (provide notification of) to the server 220 (an investigative authority or the like) information such as the position of the battery charger and a recognition number specific to the vehicle and information such as the SOC of the vehicle 3 and electric power consumption at a time point of previous travelling.

Figure 5:
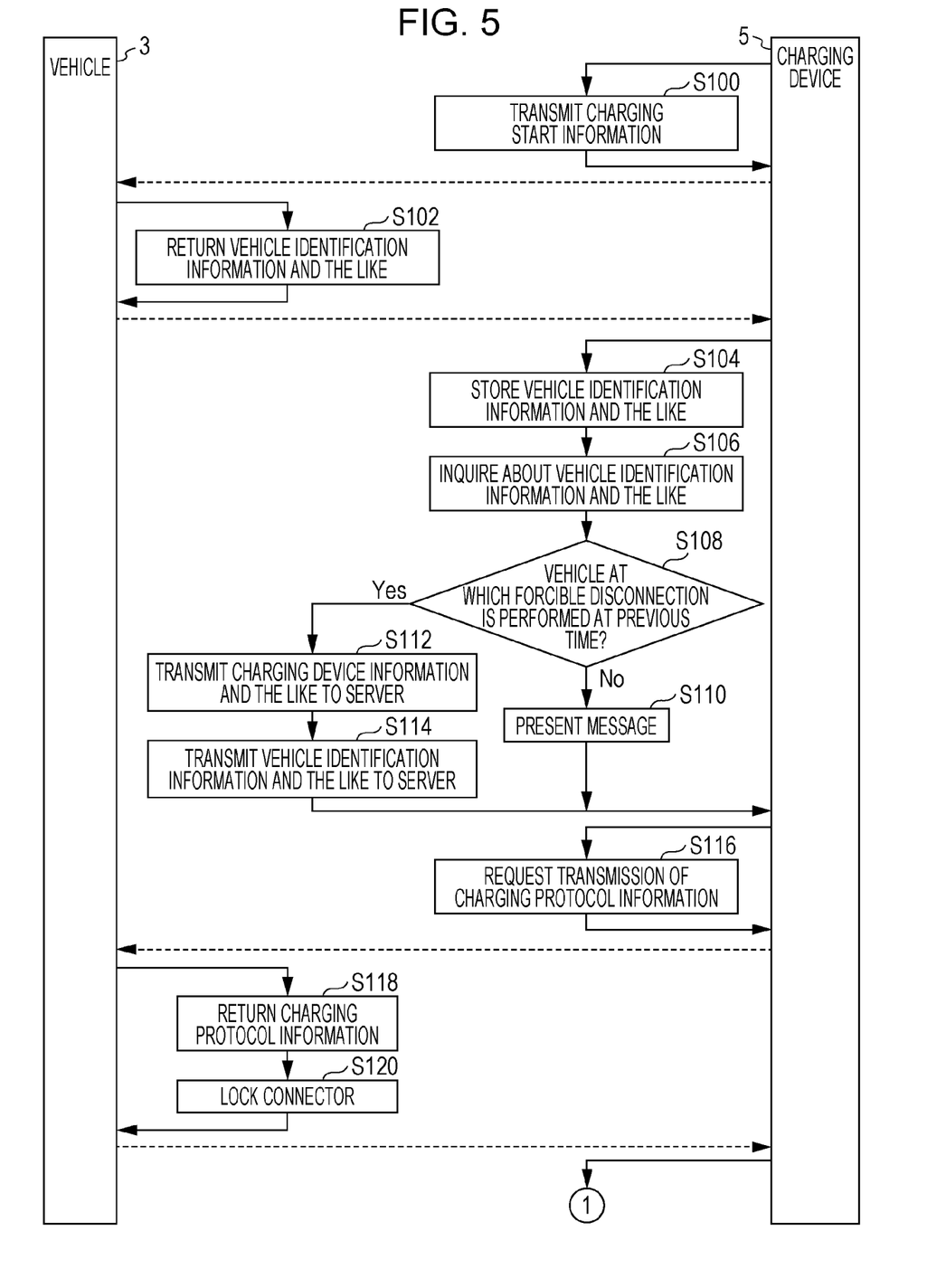
FIG. 5 is a flowchart illustrating a processing procedure of charging start processing performed by the power-feed connector disconnection device according to the embodiment and a charging device including a power-feed connector that can be coupled to a power-receiving connector to which the power-feed connector disconnection device is applied.
Figure 6:
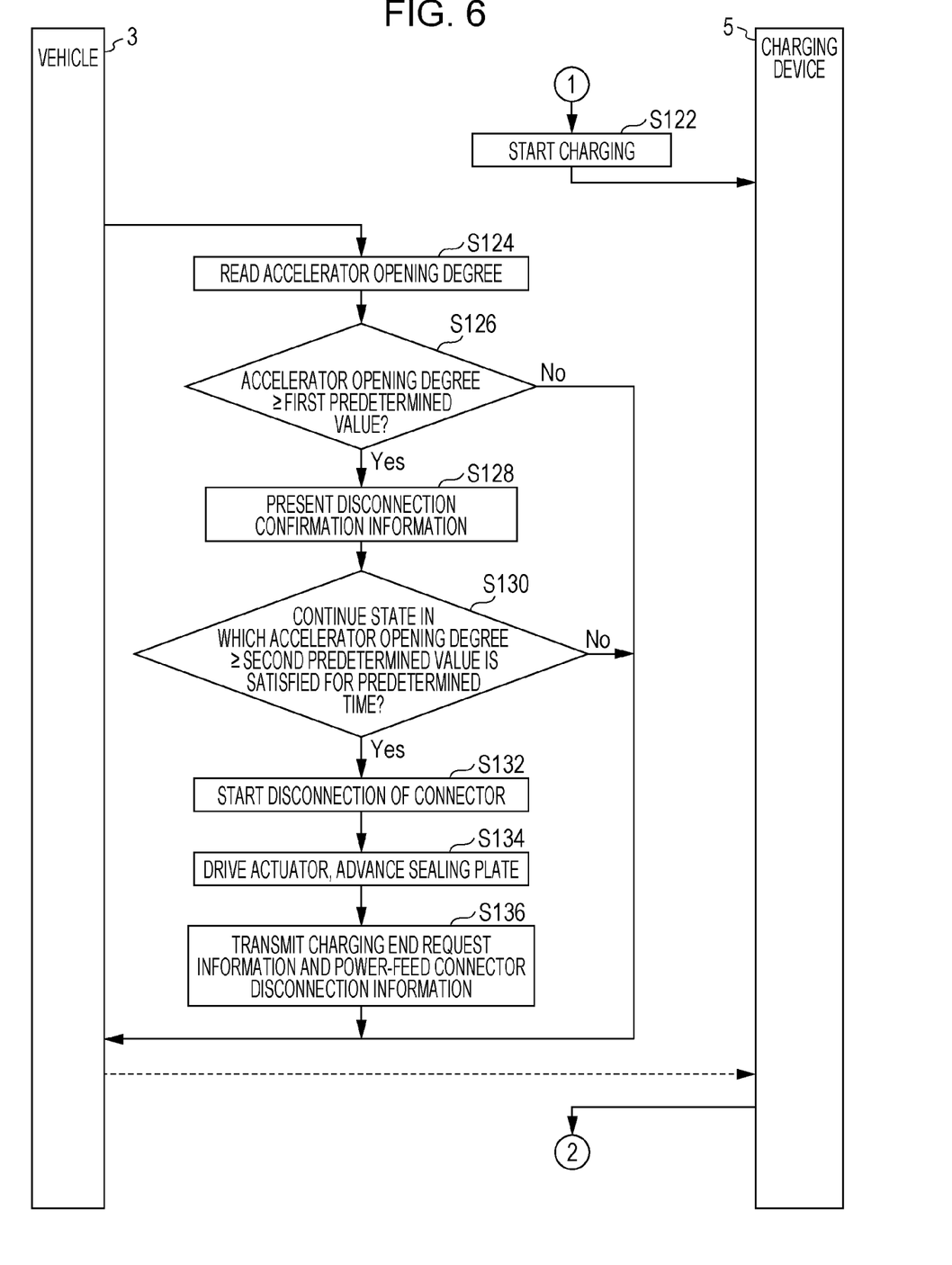
FIG. 6 is a flowchart illustrating a processing procedure of power-feed connector disconnection processing performed by the power-feed connector disconnection device according to the embodiment.
Figure 7:
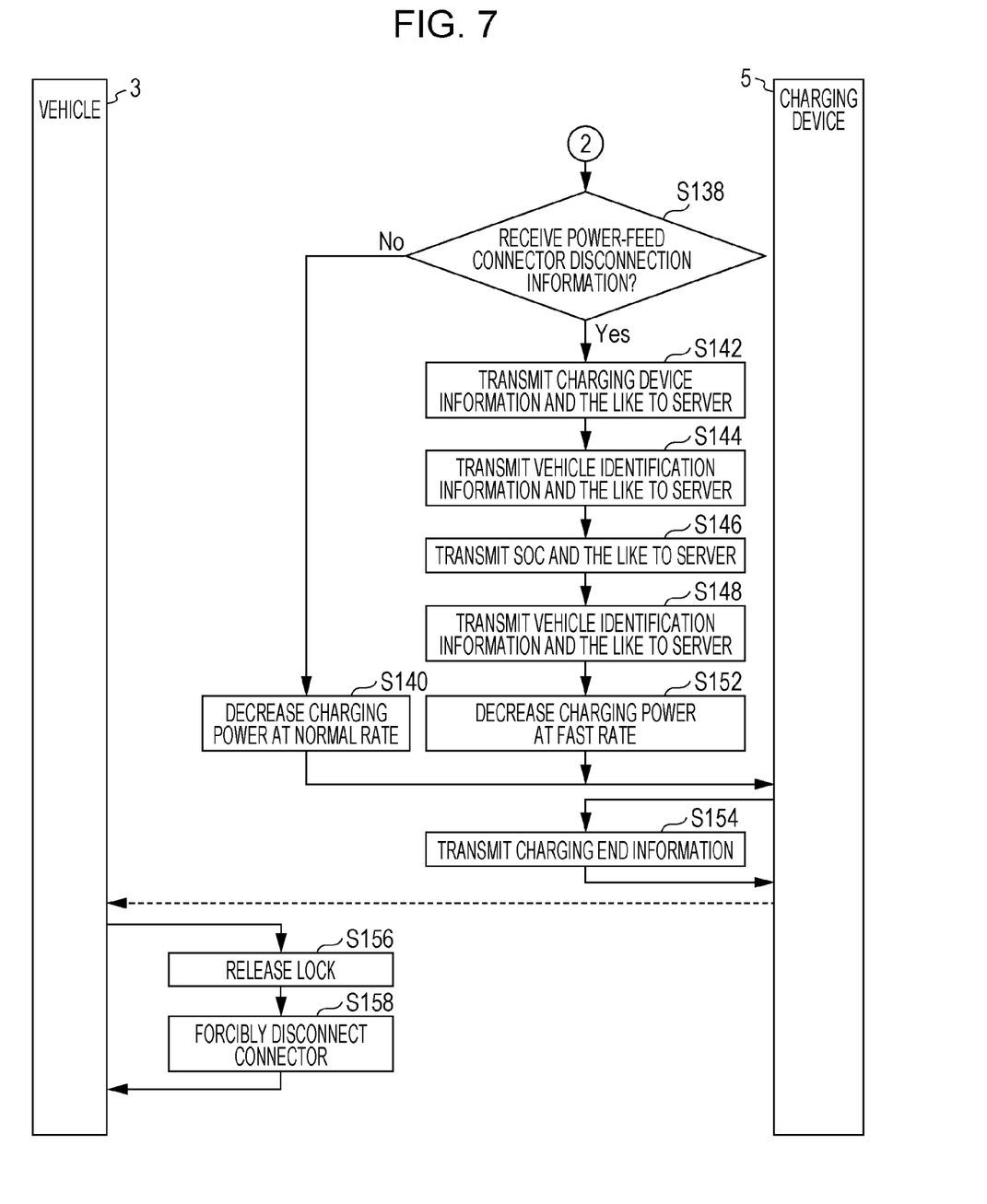
FIG. 7 is a flowchart illustrating a processing procedure of charging end processing performed by the power-feed connector disconnection device according to the embodiment and a charging device including a power-feed connector that can be coupled to a power-receiving connector to which the power-feed connector disconnection device is applied.

Next, with reference to FIGS. 5 to 7, an operation of the power-feed connector disconnection device 1 (the vehicle 3) and the charging device 5 including the power-feed connector 50 that can be coupled to the power-receiving connector 30 to which the power-feed connector disconnection device 1 is applied will be described. FIG. 5 is a flowchart illustrating a processing procedure of charging start processing performed by the power-feed connector disconnection device 1 (the vehicle 3) and the charging device 5. FIG. 6 is a flowchart illustrating a processing procedure of power-feed connector disconnection processing performed by the power-feed connector disconnection device 1 (the vehicle 3). FIG. 7 is a flowchart illustrating a processing procedure of charging end processing performed by the power-feed connector disconnection device 1 (the vehicle 3) and the charging device 5. The processing illustrated in FIGS. 5 to 7 is repeatedly performed at predetermined intervals by mainly each of the control unit 37 of the vehicle 3 and the control unit 57 of the charging device 5.

When a charging start operation is performed by a user (for example, when the charging start switch 531 is pressed down), the charging device 5 notifies the vehicle 3 of information indicating that charging will be started in step S100. Subsequently, in step S102, vehicle identification information and the like (for example, a unique ID (Vehicle Identification Number (VIN), charging infrastructure member information, credit card information, and the like), electric power consumption/fuel consumption information of the most recent trip, SOC of battery, and remaining amount of fuel (e.g., gasoline)) that may be used to identify the vehicle 3 is transmitted from the vehicle 3 to the charging device 5. The vehicle 3 recognizes that the power-feed connector 50 is coupled to the power-receiving connector 30.

In step S104, in the charging device 5, the vehicle identification information and the like, which may be used to identify the vehicle 3, transmitted from the vehicle 3 are received and stored in a memory. Subsequently, in step S106, a database (server 220) is referred to for the vehicle identification information (unique ID (VIN, charging infrastructure member information, credit card information, and the like)) that may be used to identify the vehicle 3.

Then, in step S108, based on a result of performing the reference, a determination of whether the vehicle 3 is a vehicle that has forcibly disconnected the power-feed connector 50 (the charging gun) at a previous time is made. Here, when the vehicle 3 is determined not to be the vehicle that forcibly disconnected the power-feed connector 50 at a previous time, the processing proceeds to step S110. On the other hand, when the vehicle 3 is determined to be the vehicle that forcibly disconnected the power-feed connector 50 (the charging gun) at a previous time, the processing proceeds to step S112.

In step S110, a message and/or an announcement such as "Warning: Forcibly disconnecting the charging gun may result in damage leading to costly repairs" is displayed on the operation panel 53 or the like (that is, the message and/or the announcement is presented to the user of the vehicle 3). Thereafter, the processing proceeds to step S116.

In step S112, the location (latitude/longitude and the like) of the charging device 5, the current date and time, and the like are transmitted to, for example, a server 220 of a security organization. In step S114, vehicle identification information and the like (for example, unique ID (VIN, charging infrastructure member information, credit card information, and the like), electric power consumption/fuel consumption information of the most recent trip, the SOC of the high-voltage battery 31, and remaining amount of fuel (gasoline)), which are transmitted from the vehicle 3 and may be used to identify the vehicle 3, are transmitted to, for example, the server 220 of the security organization. Thereafter, in step S116, a transmission request of charging protocol information is issued to the vehicle 3.

When the transmission request of charging protocol information is received, in step S118, information in compliance with CHAdeMO (registered trademark) and CSS standards (for example, charging current request, charging maximum voltage limitation, and the like) is transmitted (sent back) to the charging device 5. In step S120, the lock/unlock mechanism 301 (the actuator 301I) is driven and the power-receiving connector 30 and the power-feed connector 50 are locked. Thereafter, in step S122, charging (power supply to the vehicle 3) is started.

Next, in step S124, the depression amount of the accelerator pedal (the accelerator opening degree) is read on the vehicle 3 side. Then, in step S126, a determination of whether the accelerator opening degree is a first predetermined value (for example, 90%) or more is made. Here, when the accelerator opening degree is the first predetermined value or more, the processing proceeds to step S128. On the other hand, when the accelerator opening degree is less than the first predetermined value, the processing exits from the present processing, and normal charging processing is performed.

In step S128, it is determined that a driver has a starting intention, and, for example, an LCD display, a speaker, or the like is driven, and disconnection confirmation information confirming that the power-feed connector 50 will be forcibly disconnected (for example, a guidance notification such as "The charging gun is coupled—vehicle prevented from traveling. To forcibly release the charging gun, depress the accelerator pedal for three seconds.") is presented to the driver.

Subsequently, in step S130, a determination of whether a state in which the depression amount of the accelerator pedal (the accelerator opening degree) is a second predetermined value (for example, 30%) or more continues for a predetermined period of time (for example, three seconds) or more is made. Here, when the above condition is satisfied, the processing proceeds to step S132. On the other hand, when the above condition is not satisfied, the processing exits from the present processing, and normal charging processing is performed.

In step S132, it is determined (confirmed) that the driver has a starting intention, and forcible disconnection of the power-feed connector 50 is started. In this case, first, in step S134, the power-feed connector disconnection mechanism 302 (the actuator 3021) is driven and the sealing plate 3023 is moved (advanced) to the outer plate side of the vehicle 3.

Next, in step S136, charging end request information (power reduction request information) and the power-feed connector disconnection information indicating that the power-feed connector 50 will be forcibly disconnected from the vehicle 3 side (additional information such as an emergency situation flag: 1 or the like indicating a forcible disconnection in emergency) is transmitted to the charging device 5.

On the other hand, on the charging device 5 side, in step S138, a determination of whether the power-feed connector disconnection information (emergency situation flag: 1) is received is made. Here, when the power-feed connector disconnection information (emergency situation flag: 1) is received, the processing proceeds to step S142. On the other hand, when the power-feed connector disconnection information is not received (emergency situation flag: 0), the processing proceeds to step S140.

In step S140, the charging current and the voltage are lowered to predetermined values (for example, zero) at a normal rate, and thereafter, the processing proceeds to step S154.

In step S142, the position information (latitude/longitude and the like) of the charging device 5, the present date and time, and the like are transmitted to, for example, the server 220 of the security organization. In step S144, the unique ID of the vehicle 3 acquired at the charging start time and the electric power consumption/fuel consumption information of the most recent trip are transmitted to, for example, the server 220 of the security organization. Further, in step S146, information such as the SOC of the high-voltage battery 31 and the remaining amount of gasoline is transmitted to, for example, the server 220 of the security organization.

Thereafter, in step S148, information such as the unique ID of the vehicle 3 acquired at the charging start time is transmitted to, for example, a server 220 of an infrastructure facility maintenance organization. The information of the unique ID and the like is registered in, for example, a database of the server 220 of the infrastructure facility maintenance organization.

Thereafter, in step S152, the charging current and the voltage (the charging power) are lowered to predetermined values (for example, zero) at a rate faster than the normal rate. Then, in step S154, information indicating that the charging has ended is transmitted to the vehicle 3.

On the other hand, on the vehicle 3 side, when the information indicating that the charging has ended is received, in step S156, the lock/unlock mechanism 301 (the actuator 3011) is driven and the lock between the power-receiving connector 30 and the power-feed connector 50 is released. When the lock is released, in step S158, the power-feed connector 50 is disconnected from the power-receiving connector 30 by the energizing force of the compression coil springs 3024. Thereafter, the present processing ends.

As described above, according to the embodiment, when the power-feed connector 50 is coupled to the power-receiving connector 30 of the vehicle 3 (that is, when the vehicle 3 is in the READY OFF state), an index value (accelerator opening degree) that correlates with a starting intention of a driver is detected and the presence or absence of a starting intention of the driver is determined based on the detected index value (accelerator opening degree). When it is determined that the driver has a starting intention, the lock between the power-receiving connector 30 and the power-feed connector 50 is released and thereafter the power-feed connector 50 is disconnected from the power-receiving connector 30. As a result, for example, in an emergency, the power-feed connector 50 coupled to the power-receiving connector 30 of the vehicle 3 can be forcibly disconnected from inside the vehicle.

In particular, according to the embodiment, when it is determined that the driver has a starting intention, the disconnection confirmation information confirming that the power-feed connector 50 will be forcibly disconnected is presented to the driver, and the presence or absence of a starting intention of the driver is determined again after the disconnection confirmation information is presented. When it is determined (confirmed) again that the driver has a starting intention after the disconnection confirmation information is presented, the lock between the power-receiving connector 30 and the power-feed connector 50 is released and thereafter the power-feed connector 50 is disconnected from the power-receiving connector 30. Therefore, it is possible to reliably prevent a situation in which the power-feed connector 50 is erroneously disconnected by an erroneous determination.

According to the embodiment, the depression amount of the accelerator pedal (the accelerator opening degree) is detected as the above index value, and when the depression amount of the accelerator pedal is the first predetermined value or more, it is determined that the driver has a starting intention. Therefore, whether the driver has a starting intention can be more properly determined, and even if, for example, the driver panics in an emergency, it is possible to reliably disconnect the power-feed connector 50.

In particular, according to the embodiment, first (as a first step), when the depression amount of the accelerator pedal (the accelerator opening degree) is the first predetermined value or more, it is determined that the driver has a starting intention, and the disconnection confirmation information is presented. Thereafter, again (as a second step), when a state in which the depression amount of the accelerator pedal is the second predetermined value or more continues for a predetermined period of time or more, it is determined that the driver has a starting intention. Therefore, while reliably preventing a situation in which the power-feed connector 50 is erroneously disconnected by an erroneous determination, it is possible to more reliably disconnect the power-feed connector 50 even if, for example, the driver panics in an emergency.

According to the embodiment, when the lock between the power-receiving connector 30 and the power-feed connector 50 is released and the power-feed connector 50 is disconnected from the power-receiving connector 30, the charging stop request information for requesting charging to be stopped (the power reduction request information for requesting reduction of charging power) is transmitted in advance to the charging device 5 coupled with the power-feed connector 50. Therefore, it is possible to more safely disconnect the power-feed connector while preventing electric shock and the like.

According to the embodiment, when the lock between the power-receiving connector 30 and the power-feed connector 50 is released and the power-feed connector 50 is disconnected from the power-receiving connector 30, the vehicle identification information that may be used to identify the vehicle 3 and the power-feed connector disconnection information indicating that the power-feed connector 50 will be forcibly disconnected from the vehicle 3 side is transmitted in advance to the charging device 5 coupled with the power-feed connector 50. Therefore, it is possible to identify whether the vehicle 3 has forcibly disconnected the power-feed connector 50, and accordingly, for example, it is possible to claim costs and the like afterward.

According to the embodiment, the vehicle identification information that may be used to identify the vehicle 3 and the power-feed connector disconnection information indicating that the power-feed connector 50 will be forcibly disconnected from the vehicle 3 side are received, and the received vehicle identification information and power-feed connector disconnection information are transmitted to the server 220 (external apparatus). Therefore, for example, the above information may be utilized also for criminal investigations and the like.

While the embodiment of the disclosure has been described, the disclosure is not limited to the embodiment described above, but can be variously changed. For example, the configuration (structure) of the lock/unlock mechanism 301 and the configuration (structure) of the power-feed connector disconnection mechanism 302 described above are examples and not limited to the embodiment described above.

In the embodiment described above, the depression amount of the accelerator pedal (the accelerator opening degree) is used to determine the presence or absence of a starting intention of the driver. However, it is possible to use information other than the accelerator pedal opening degree, such as a system startup operation (READY ON operation) such as pressing a start switch, and an operation state (ON operation) of an emergency switch.

According to the disclosure, for example, in an emergency, a power-feed connector coupled to a power-receiving connector of a vehicle can be forcibly disconnected from inside the vehicle.

The invention claimed is:

1. A power-feed connector disconnection device, comprising:
an index value detector configured to detect an index value that correlates with a starting intention of a driver to start a vehicle when a power-feed connector is coupled to a power-receiving connector of the vehicle;
a starting intention determiner configured to determine a presence or an absence of the starting intention of the driver on a basis of the index value detected by the index value detector when the power-feed connector is coupled to the power-receiving connector of the vehicle;
a lock-releasing unit that is provided in the power-receiving connector and is configured to release a lock between the power-receiving connector and the power-feed connector when the starting intention determiner determines that the driver has the starting intention; and
a power-feed connector disconnection unit that is provided in the power-receiving connector and is configured to disconnect the power-feed connector from the power-receiving connector after the lock-releasing unit releases the lock between the power-receiving connector and the power-feed connector when the starting intention determiner determines that the driver has the starting intention.

2. The power-feed connector disconnection device according to claim 1, further comprising:
a confirmation information presentation unit configured to present to the driver disconnection confirmation information confirming that the power-feed connector is to be forcibly disconnected when the starting intention determiner determines that the driver has the starting intention,
wherein the starting intention determiner determines again the presence or the absence of the starting intention of the driver after the confirmation information presentation unit presents the disconnection confirmation information,
wherein the lock-releasing unit releases the lock between the power-receiving connector and the power-feed connector when the starting intention determiner determines again that the driver has the starting intention after the confirmation information presentation unit presents the disconnection confirmation information, and
wherein the power-feed connector disconnection unit disconnects the power-feed connector from the power-receiving connector after the lock-releasing unit releases the lock between the power-receiving connector and the power-feed connector when the starting intention determiner determines again that the driver has the starting intention after the confirmation information presentation unit presents the disconnection confirmation information.

3. The power-feed connector disconnection device according to claim 2, wherein the index value detector detects an operation amount of an accelerator as the index value, and
wherein the starting intention determiner:
determines that the driver has the starting intention when the operation amount of the accelerator detected by the index value detector is a first predetermined value or more; and
determines, when determining again the presence or the absence of the starting intention of the driver after the disconnection confirmation information is presented, that the driver has the starting intention in a case that a state in which the operation amount of the accelerator is a second predetermined value or more continues for a predetermined period of time or more.

4. The power-feed connector disconnection device according to claim 3, further comprising:
a transmitter configured to transmit power reduction request information for requesting reduction of charging power to a charging device coupled with the power-feed connector when the lock between the power-receiving connector and the power-feed connector is released and the power-feed connector is disconnected from the power-receiving connector.

5. The power-feed connector disconnection device according to claim 4, wherein the transmitter transmits to the charging device coupled with the power-feed connector vehicle identification information that is used to identify the vehicle and power-feed connector disconnection information indicating that the power-feed connector is to be forcibly disconnected from a side of the vehicle when the lock between the power-receiving connector and the power-feed connector is released and the power-feed connector is disconnected from the power-receiving connector.

6. The power-feed connector disconnection device according to claim 5, wherein the power-feed connector Is included in a charging device that comprises:
a receiver configured to receive the vehicle identification information that is used to identify the vehicle and the power-feed connector disconnection information indicating that the power-feed connector is to be forcibly disconnected from the side of the vehicle; and
a transmitter configured to transmit to an external apparatus the vehicle identification information and the power-feed connector disconnection information received by the receiver.

7. The power-feed connector disconnection device according to claim 2, further comprising:
a transmitter configured to transmit power reduction request information for requesting reduction of charging power to a charging device coupled with the power-feed connector when the lock between the power-receiving connector and the power-feed connector is released and the power-feed connector is disconnected from the power-receiving connector.

8. The power-feed connector disconnection device according to claim 7, wherein the transmitter transmits to the charging device coupled with the power-feed connector vehicle identification information that is used to identify the vehicle and power-feed connector disconnection information indicating that the power-feed connector is to be forcibly disconnected from a side of the vehicle when the lock between the power-receiving connector and the power-feed connector is released and the power-feed connector is disconnected from the power-receiving connector.

9. The power-feed connector disconnection device according to claim 8, wherein the power-feed connector is included in a charging device that comprises:
a receiver configured to receive the vehicle identification information that is used to identify the vehicle and the power-feed connector disconnection information indicating that the power-feed connector is to be forcibly disconnected from the side of the vehicle; and
a transmitter configured to transmit to an external apparatus the vehicle identification information and the power-feed connector disconnection information received by the receiver.

10. The power-feed connector disconnection device according to claim 1, wherein the index value detector detects an operation amount of an accelerator as the index value, and
wherein the starting intention determiner determines that the driver has the starting intention when the operation amount of the accelerator detected by the index value detector is a predetermined value or more.

11. The power-feed connector disconnection device according to claim 10, further comprising:
a transmitter configured to transmit power reduction request information for requesting reduction of charging power to a charging device coupled with the power-feed connector when the lock between the power-receiving connector and the power-feed connector is released and the power-feed connector is disconnected from the power-receiving connector.

12. The power-feed connector disconnection device according to claim 11, wherein the transmitter transmits to the charging device coupled with the power-feed connector vehicle identification information that is used to identify the vehicle and power-feed connector disconnection information indicating that the power-feed connector is to be forcibly disconnected from a side of the vehicle when the lock between the power-receiving connector and the power-feed connector is released and the power-feed connector is disconnected from the power-receiving connector.

13. The power-feed connector disconnection device according to claim 12, wherein the power-feed connector is included in a charging device that comprises:
a receiver configured to receive the vehicle identification information that is used to identify the vehicle and the power-feed connector disconnection information indicating that power-feed connector is to be forcibly disconnected from the side of the vehicle; and
a transmitter configured to transmit to an external apparatus the vehicle identification information and the power-feed connector disconnection information received the receiver.

14. The power-feed connector disconnection device according to claim 1, wherein the index value detector detects an operation state of an emergency switch as the index value, and
wherein the starting intention determiner determines that the driver has the starting intention when the operation state of the emergency switch detected by the index value detector is an ON state.

15. The power-feed connector disconnection device according to claim 1, further comprising:
a confirmation information presentation unit configured to present to the driver disconnection continuation information confirming that the power-feed connector is to be forcibly disconnected when the starting intention determiner determines that the driver has the starting intention,
wherein the starting intention determiner determines again the presence or the absence of the starting intention of the driver after the confirmation information presentation unit presents the disconnection confirmation information.

16. The power-feed connector disconnection device according to claim 15, wherein the lock-releasing unit releases the lock between the power-receiving connector and the power-feed connector when the starting intention determiner determines again that the driver has the starting intention after the confirmation information presentation unit presents the disconnection confirmation information.

17. The power-feed connector disconnection device according to claim 16, wherein the power-feed connector disconnection unit disconnects the power-feed connector from the power-receiving connector after the lock-releasing unit releases the lock between the power-receiving connector and the power-feed connector.

18. A power-feed connector disconnection device, comprising:
an index value detector configured to detect an index value that correlates with a starting intention of a driver to start a vehicle when a power-feed connector is coupled to a power-receiving connector of the vehicle; and
a circuitry configured to:
determine a presence or an absence of the starting intention of the driver on a basis of the index value detected by the index value detector when the power-feed connector is coupled to the power-receiving connector of the vehicle; and
release a lock between the power-receiving connector and the power-feed connector when the starting intention determiner determines that the driver has the starting intention; and
disconnect the power-feed connector from the power-receiving connector after the circuitry releases the lock between the power-receiving connector and the power-feed connector when the circuitry determines that the driver has the starting intention.

* * * * *